Jan. 30, 1968 A. M. McINNIS 3,366,212

EMBOSSING TOOL CAPABLE OF USING DIFFERENT WIDTH TAPES

Filed May 16, 1966 5 Sheets-Sheet 1

INVENTOR.
ANDREW M. McINNIS
BY White & Haefliger
ATTORNEYS.

Jan. 30, 1968 A. M. McINNIS 3,366,212

EMBOSSING TOOL CAPABLE OF USING DIFFERENT WIDTH TAPES

Filed May 16, 1966 5 Sheets-Sheet 2

INVENTOR.
ANDREW M. McINNIS
BY White & Haefliger
ATTORNEYS.

EMBOSSING TOOL CAPABLE OF USING DIFFERENT WIDTH TAPES

Filed May 16, 1966 5 Sheets-Sheet 3

INVENTOR.
ANDREW M. McINNIS
By White & Haefliger
ATTORNEYS

Jan. 30, 1968 A. M. McINNIS 3,366,212

EMBOSSING TOOL CAPABLE OF USING DIFFERENT WIDTH TAPES

Filed May 16, 1966 5 Sheets-Sheet 4

INVENTOR.
ANDREW M. McINNIS
By White & Haefliger
ATTORNEYS.

Jan. 30, 1968 A. M. McINNIS 3,366,212

EMBOSSING TOOL CAPABLE OF USING DIFFERENT WIDTH TAPES

Filed May 16, 1966 5 Sheets-Sheet 5

INVENTOR.
ANDREW M. McINNIS
BY White & Haefliger
ATTORNEYS.

United States Patent Office 3,366,212

Patented Jan. 30, 1968

3,366,212

EMBOSSING TOOL CAPABLE OF USING DIFFERENT WIDTH TAPES

Andrew M. McInnis, Covina, Calif., assignor, by mesne assignments, to Apsco Products, Inc., Los Angeles, Calif., a corporation of Illinois Filed May 16, 1966, Ser. No. 550,403
12 Claims. (Cl. 197—6.7)

ABSTRACT OF THE DISCLOSURE

The disclosed subject matter concerns a tape embossing tool characterized by unusually advantageous structure, functioning and results. These include capacity to emboss tape of different widths; provision for incomplete tape severing to free the tape for latter selective severing; provision for stabilization of the tape; and provision of a magazine for tape of different widths.

This invention relates generally to hand operating tape embossing tools, and more particularly concerns improvements in such equipment.

In the past, embossing tools had suffered from certain disadvantages, among which are incompatibility with respect to tape of different widths, severing of tape in such a way that peeling of or removal of backer layer from the vinyl layer is made objectionably difficult, lack of provision for incomplete severing of tape; and instability of the tape during embossing. It is a major object of the invention to overcome these disadvantages, and at the same time to provide a tool having unusual advantages in construction and operation. Typical of the tapes adapted for embossment by the present tool is that described in U.S. Patent 3,036,945 to Souza. Such tape includes a plastic sheet adapted to crease whiten when embossed, and a backer sheet adhesively bonded thereto.

Basically, the improved tape embossing tool comprises an elongated body, structure having die means adjacent which tape is subject to advancement, such structure carried on the body to be bodily displaced relative thereto and relative to the tape so as to bring selected die means into tape engaging position, a hand operated actuator carried by the body, means to cause the selected die means to forcibly engage the tape adjacent thereto in response to operation of the actuator, and spaced generally longitudinally extending paths formed in the body to receive and guide advancement of tape of different widths into adjacency to the selected die means. Such paths are for example provided by split body sections forming complementary portions of the paths. Typically, the structure may comprise a rotor to receive the tape and having an axis of rotation with respect to which the tape of whatever width is received eccentrically. Also, means is typically provided to effect forward advancement of the tape in response to operation of the actuator, such means including a driver to engage and frictionally drive tape toward the rotor, the tape guide paths being directed to guide advancement of tapes of different widths toward the driver for engagement therewith. As will be seen, a tape magazine is also provided with paths for tape of different sizes located to feed tape to the tape paths in the body.

The construction of the tool is such that a peripherally toothed member is typically connected to rotate the tape driver, a catch biases the toothed member against rotation, and a pusher is movable to engage the toothed member to rotate same against the yieldable bias of the catch, in response to movement of the pusher between collapsed and extended positions.

As regards tape cutting, the die means on the rotor structure typically includes cutters carried to cut only part way through the tape at locations spaced apart in the direction of tape advancement, thereby to free the tape for later selective severing in such a way as to allow easy separation of the backer from the embossed vinyl layer, as will be described. Typically, two cutters are spaced longitudinally to cut through one layer of the tape, as for example the plastic layer subject to color change upon embossment, and a third cutter is located to cut through the opposite layer of the tape (as for example the backer) and generally intermediate the two cuts into said one layer. Such cutting and embossing are aided by stabilization of the tape afforded by ribbing on an upper rotor disc and also on spring fingers of a lower rotor member, the ribbing being presented toward the path of tape advancement through the rotor, for engagement with the tape during both embossing and cutting.

These and other objects and advantages of the invention, as well as the details of illustrative embodiments, will be more fully understood from the following detailed description of the drawings, in which.

Figures 1, 2, 3, 4:
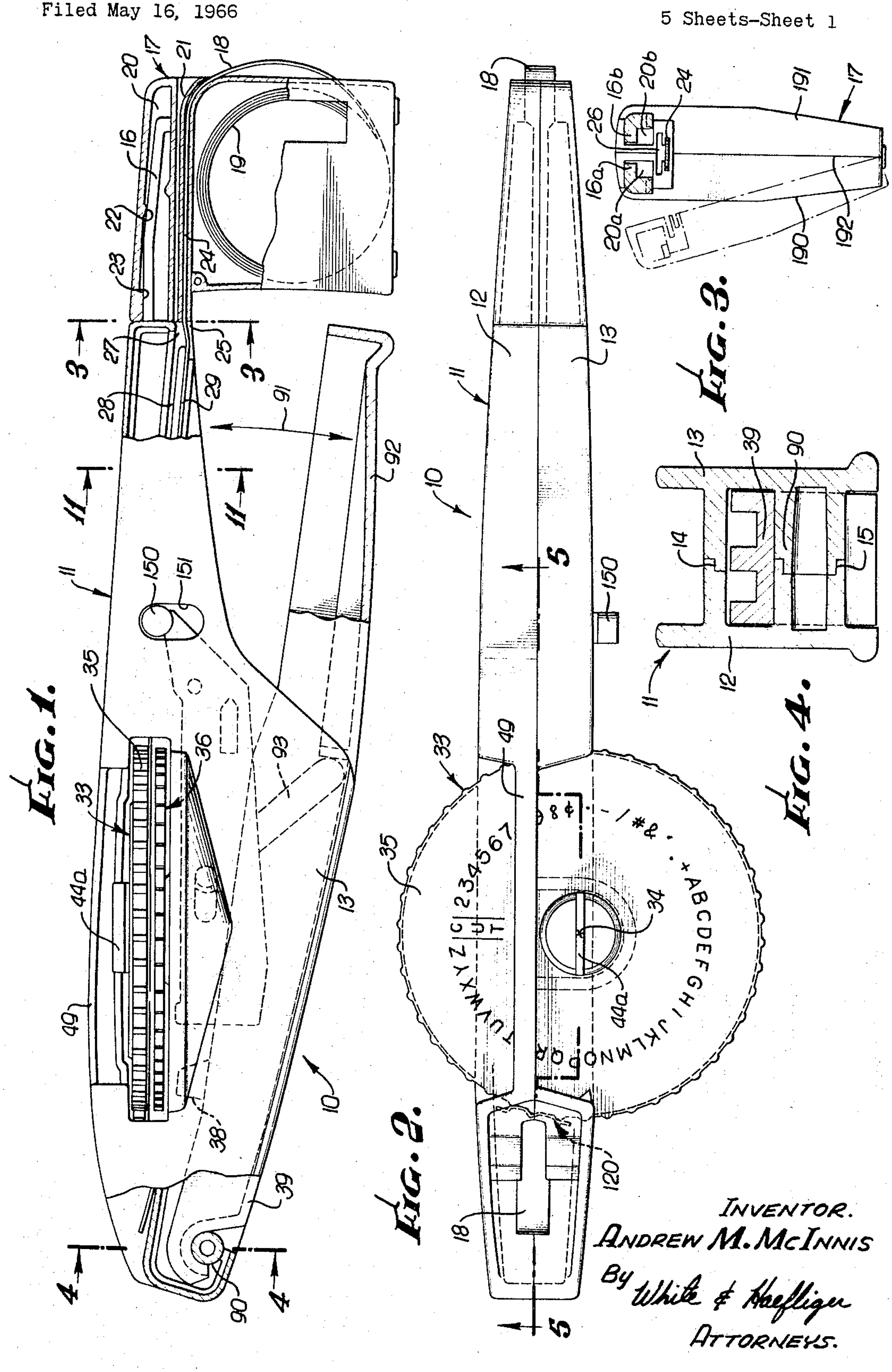
FIG. 1 is a side elevation of the tool, partially broken away to show interior construction.
FIG. 2 is a top plan view of the FIG. 1 tool.
FIG. 3 is a section taken on line 3—3 of FIG. 1.
FIG. 4 is an enlarged section taken on line 4—4 of FIG. 1.

Referring first to FIGS. 1 and 2, the embossing tool 10 is shown to include a body 11 having split sections 12 and 13 which are interconnected along the longitudinal extent of the body as for example at locations 14 and 15 seen in FIG. 4. The body may consist of plastic material with the two sections 11 and 12 adhesively bonded together.

Releasably connected to the rearward projecting portion 16 of the body is a magazine 17 for holding tape 18 is a roll 19 as illustrated in FIG. 1. The magazine has an upper compartment 20 to receive the body rearward portion 16 with frictional engagement at points 21, 22 and 23 sufficient to releasably retain the magazine upon the body portion 16. Tape is fed off the roll 19 and through a slot 24 opening in a forward direction toward the zone 25 immediately forward of the magazine. For example, the slot 24 may be of a width to receive and guide relatively narrow width tape such as ¼" in width. FIGS. 1 and 3 show a second and slightly wider slot 26 spaced above the slot 24 to receive somewhat wider tape, as for example ⅜" in width. Wider tape is seen for example at 300 in FIGS. 11, 12 and 15. Slot 26 guides advancement of the tape toward a zone 27 directly rearward of an upper path or slot 28 in the body 11. Correspondingly, zone 25 is directly rearward of a lower path or slot 29 in the body to receive the narrower width tape.

FIG. 3 shows the magazine 17 as typically formed by left and right plastic half sections 190 and 191 interconnected along the parting line 192. The body portion 16 is also seen in FIG. 3 to comprise left and right tongues **16*a* and 16*b* received in the upper compartment sections 20*a* and 20*b*** for frictional engagement with the magazine at the points mentioned above.

Figure 5:
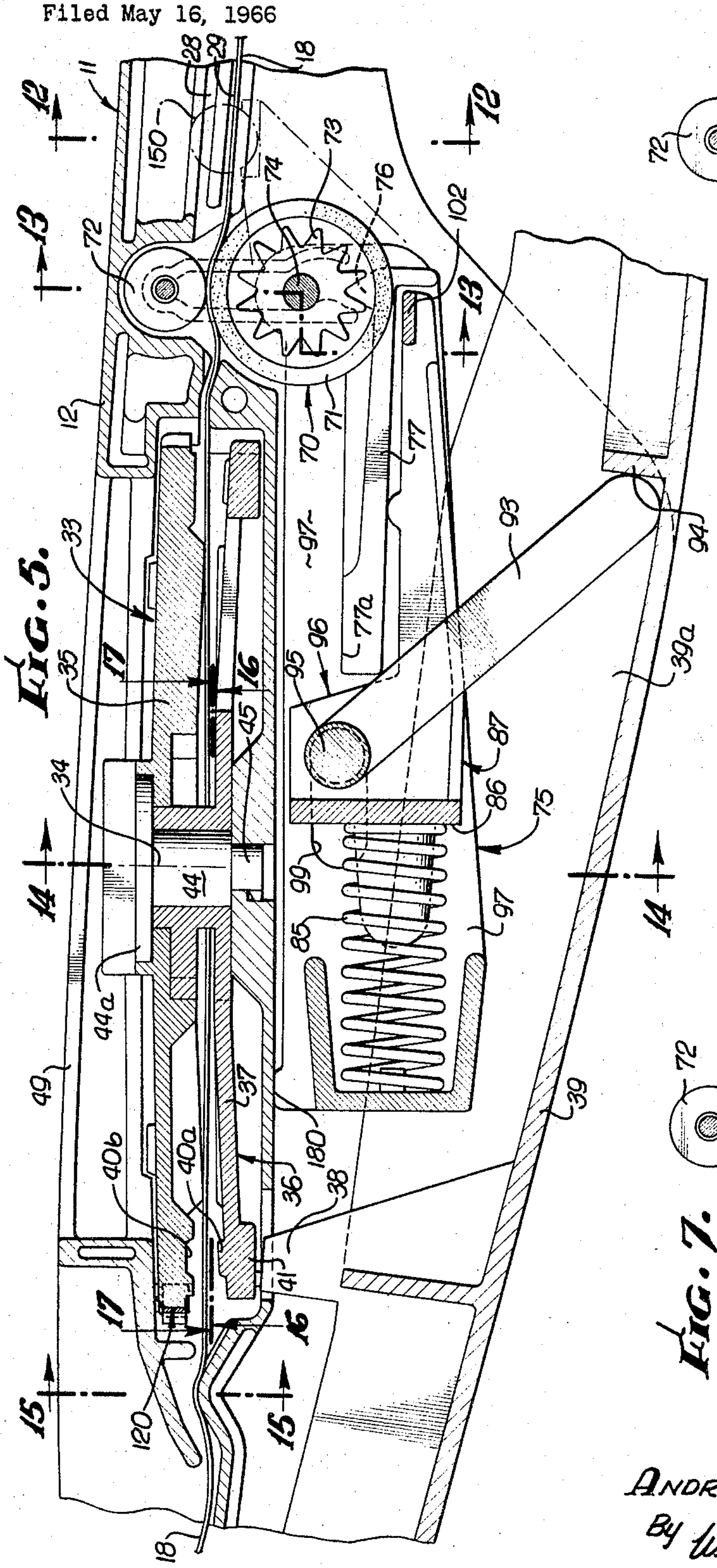
FIG. 5 is an enlarged fragmentary vertical section taken through the tool, prior to collapse of the actuator or trigger, taken on line 5—5 of FIG. 2.
Figures 11, 12, 13, 14, 15:
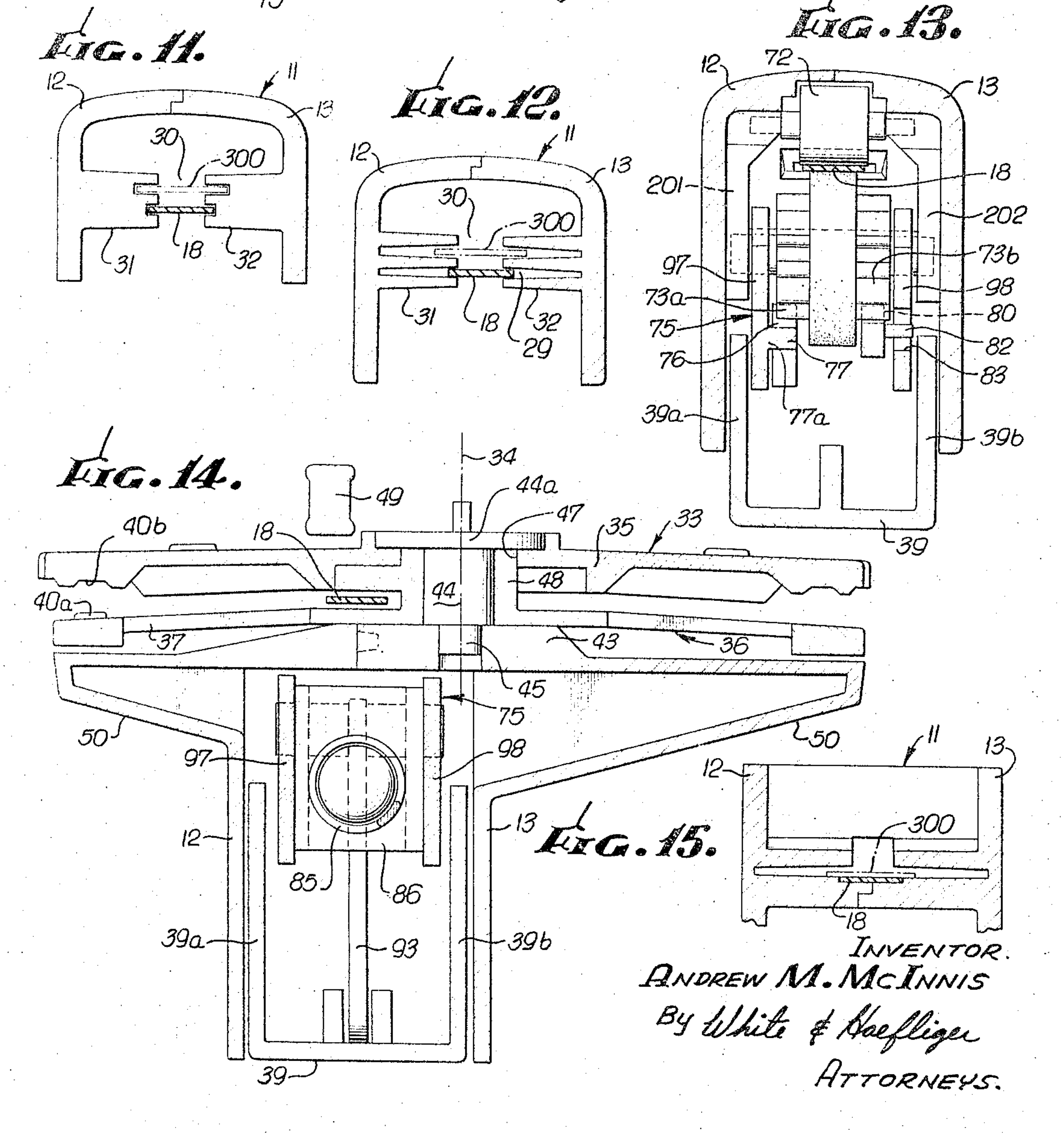
FIG. 11 is an enlarged section taken on line 11—11 of FIG. 1.
FIG. 12 is an enlarged section taken on line 12—12 of FIG. 5.
FIG. 13 is an enlarged section taken on line 13—13 of FIG. 5.
FIG. 14 is a section taken on line 14—14 of FIG. 5.
FIG. 15 is a section taken on line 15—15 of FIG. 5.

Extending the description to FIGS. 5, 11 and 12, the tape feed paths 28 and 29 are shown to extend generally longitudinally and in parallel relation to receive and guide advancement of the tapes of different widths, with minimum frictional engagement with body structure. Thus, for example, a gap is formed at 30 between internal flanges 31 and 32, the latter having provided therein the slots which receive edge portions of the tapes. Generally speaking, tape of either width is advanced into adjacency to selected die means carried by structure subject to bodily displacement relative to the tape, thereby bringing selected die means into tape engaging position. In addition, means is provided to cause the selected die means to forcibly engage the tape adjacent thereto in response to operation of a hand operated actuator carried by the body.

Figures 8, 9:
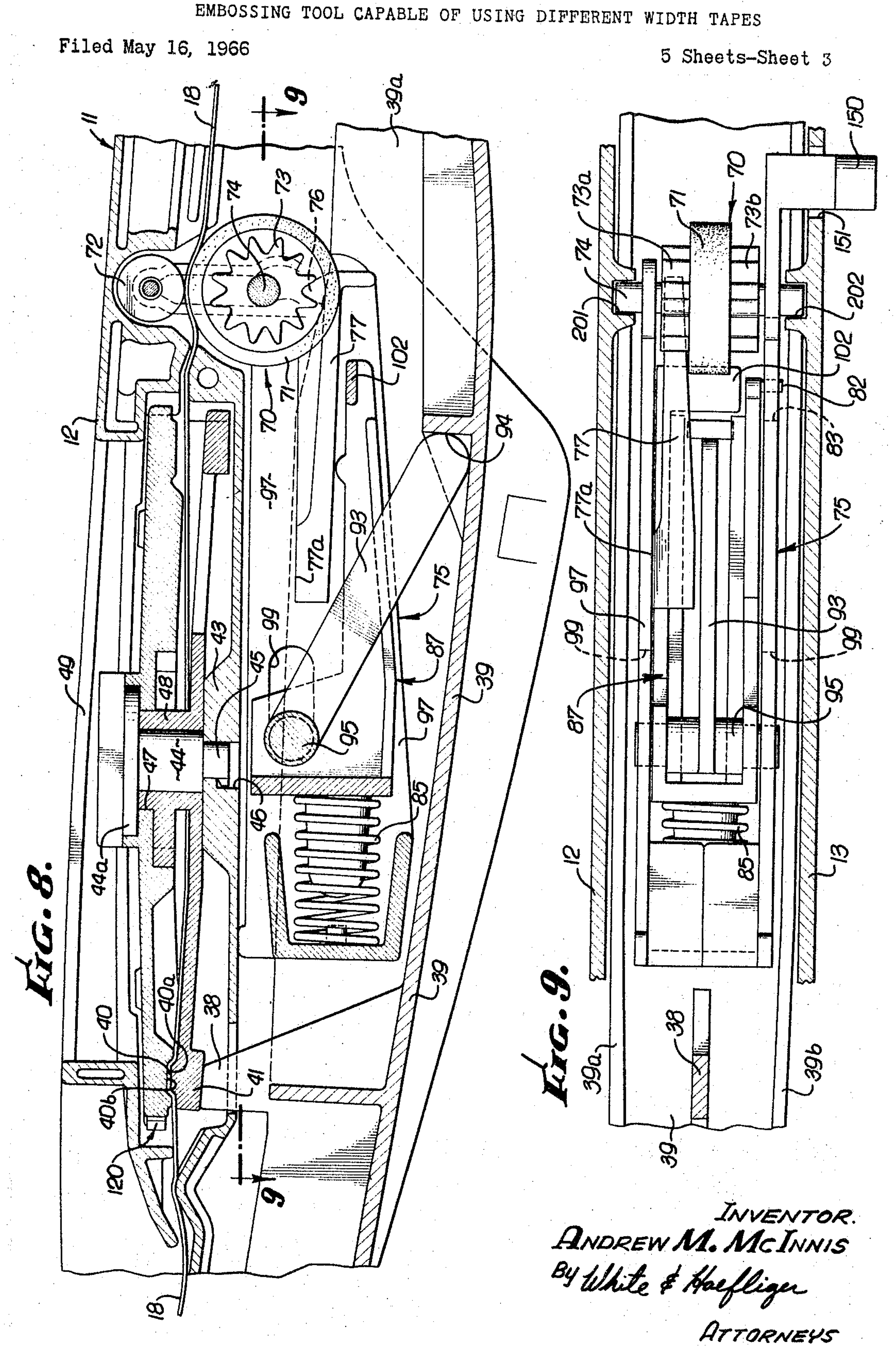
FIG. 8 is a view like FIG. 5 showing the mechanism in position of operation by the actuator moved to collapsed position, the tape then being embossed.
FIG. 9 is a section taken on line 9—9 of FIG. 8.
Figures 16, 17, 18, 19, 20, 21:
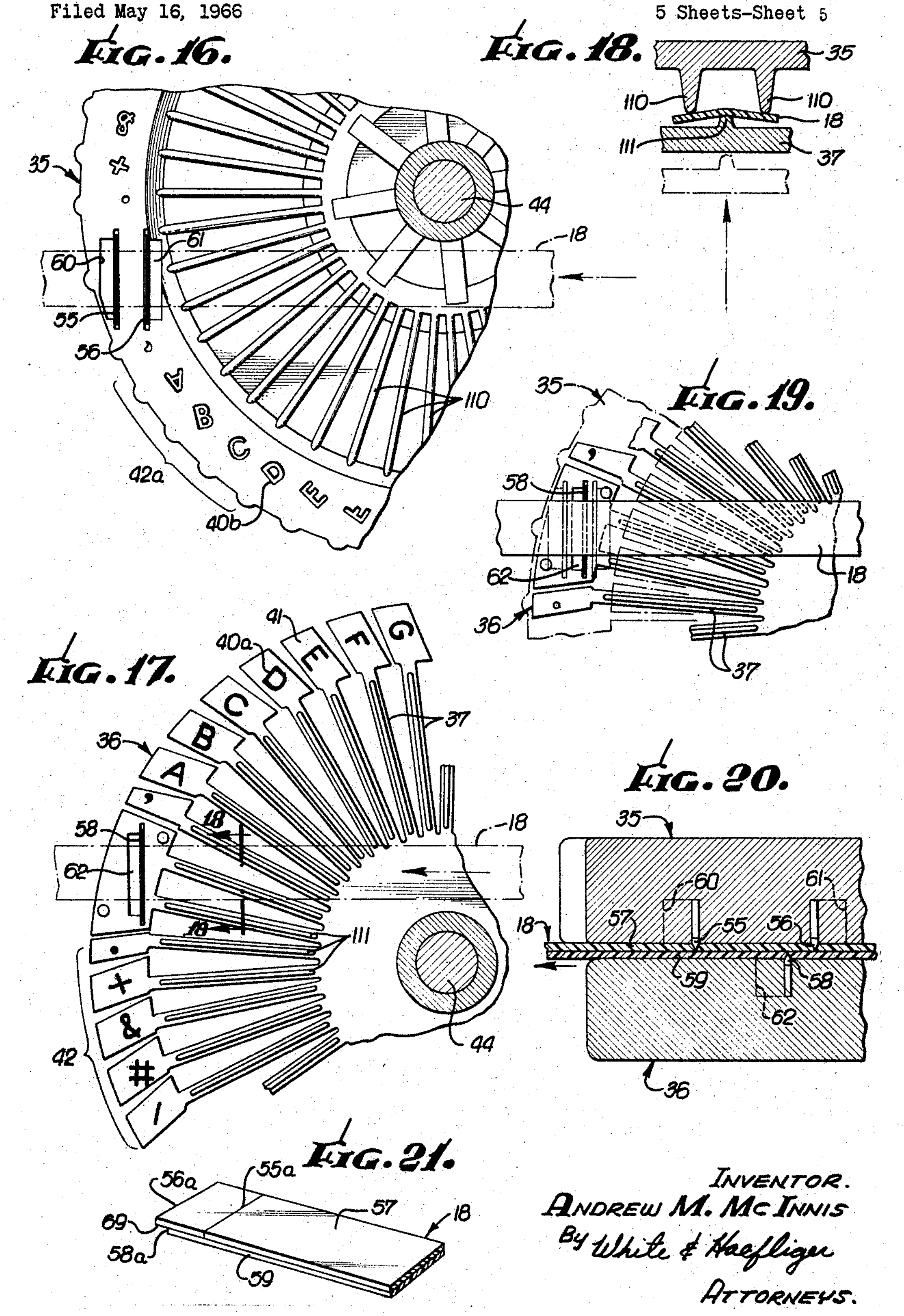
FIG. 16 is a fragmentary view taken on line 16—16 of FIG. 5.
FIG. 17 is a fragmentary view taken on line 17—17 of FIG. 5.
FIG. 18 is a section taken on line 18—18 of FIG. 17.
FIG. 19 is a composite view showing the tape fed between cutters on the FIG. 16 and 17 rotor parts.
FIG. 20 is an enlarged section showing tape cutting.
FIG. 21 is a perspective view of tape that has been cut by the tool and separated.

As shown in FIGS. 1, 5, 8, 14, 16 and 17, the die carrying structure may comprise a rotor generally indicated at 33 adapted to receive the tape and having an axis of rotation 34 with respect to which the tape is received eccentrically. More specifically, the rotor includes an upper disc 35 carrying upper die parts spaced about the axis 34 and a lower rotor element 36 having spring fingers 37 carrying lower die parts. Such fingers extend generally away from the axis 34 so as to be individually flexible upwardly toward the upper rotor disc as for example is illustrated in FIG. 8. As there shown, a pusher 38 is carried on the actuator 39 so as to be movable in response to displacement of the actuator to completely collapsed condition to effect forcible tape engagement by the lower and upper die parts for embossing tape advanced between complementary die parts, as seen at 40 in FIG. 8. Typically, the die parts include raised portions **40*a* on the spring finger terminals 41 as seen in FIG. 17, and complementary recessed portions 40*b* on the disc 35 seen in FIG. 16. Such structure could alternatively be reversed, with raised portions on disc 35 and recessed portions on the spring fingers. Among the embossing die parts may be included letters of the alphabet as well as the common figures or indicia indicated within the bracket 42 of FIG. 17 and 42*a*** of FIG. 16.

The rotor structure 33 is typically supported on a table portion 43 of the body section 13, and pivoted for rotation as by a bearing 44 capped at **44*a* and projecting at 45 into a bore 46 of that table portion. Further, the disc 35 may be received downwardly at 47 on a sleeve portion 48 of the lower rotor element 36 so as to rotate therewith upon connection thereto. The body 11 may include a strap 49 integral with body section 12 and extending over the rotor structure as best seen in FIG. 14 for retaining it in mounted position as shown. A laterally opposite extension of the table is seen as carried by the section at 50**.

In accordance with another important aspect of the invention, the die means include cutters carried by the die mounting structure to cut only part way through and crosswise thereof the tape at locations spaced apart in the direction of tape advancement, thereby to free the tape for selective severing, as for example, following detachment of an elongated portion of the tape from the tool. As one example of this, reference is made to FIGS. 16, 17, 19 and 20 showing two cutters 55 and 56 spaced longitudinally to cut through one layer 57 of the tape 18, and a third cutter 58 at the opposite side of the tape located to cut through the opposite layer 59 of the tape along a line parallel to the other cuts at a point generally intermediate the cuts made by the cutters 55 and 56. The upper cutters 55 and 56 may be carried by the disc 35 as seen in FIG. 16, and the lower cutter 58 may be carried by the element 36 as seen in FIG. 17. Hollows are formed at 60, 61 and 62 adjacent the cutters to facilitate their insertion and removal relative to the rotor structure. Since the tape is not completely severed by the cutting operation of the cutters, a large number of embossed lengths of the tape remain interconnected for ease of manipulation, yet in condition for later ready manual pull separation. For example, the tape segment shown in FIG. 21 is shown as having been cut at locations **55*a*, 56*a* and 58*a* corresponding to the cutters 55, 56 and 58 in FIG. 20. Pull separation has removed the backer from the underside 69 of the upper layer 57, which may for example be subject to crease whitening upon embossment. Layers 57 and 59 are normally adhesively bonded together to form composite tape, and removal of the backer 59 facilitates adhesive application of the layer 57 to a workpiece. FIG. 21 also indicates that removal of the backer 59 is facilitated since its cut edge at location 58*a* is offset longitudinally from the cut edges of the layer 57 at locations 55*a* and 56*a*. The cutting means is, of course, operable only when the rotor 33** is turned to the "CUT" position.

Referring to FIGS. 5–10, the tool typically includes means to effect advancement of the tape in response to operation of the actuator lever 39, such means incorporating the driver to engage and frictionally drive the tape toward the rotor structure. In this regard, the driver is located to receive tape from either of the paths 28 and 29 discussed above. One such a driver is shown in the form of a wheel 70 having a friction surface, as for example an elastomeric rim 71 to deflect the tape toward the idler 72 as seen in FIG. 8, thereby to lightly compress the tape between the driver and the idler wheels or rolls for advancement. The tape advancing means also may include a peripherally toothed member 73 mounted to turn about axis of the pin 74 with the driver so as to rotate the latter. The pin is carried by the frame flanges 97 and 98 of carrier 75 as best seen in FIG. 13. The pin 74 extends through carrier flanges 97 and 98, so that the pin terminals have guided reception in the vertical slots 201 and 202 in the body sections 12 and 13, as seen in FIG. 9. Carrier lug 150 is received in slot 151 of body section 13, as seen in FIGS. 1 and 2. When lug 150 is depressed downwardly, drive wheel 70 is depressed, allowing initial tape insertion upon feeding of the tape between driver 70 and idler 72.

The toothed member 73 is normally yieldably biased against rotation by a catch 76 engaged with the toothed periphery of the member 73 as seen in FIG. 8, thereby to restrain the tape against movement except when desired. The catch is given yieldable bias toward the member 73 as by a spring finger which may be formed with a leg 77 as seen in FIG. 13. Leg 77 may be integral with carrier flange 97 at **77*a*. As there shown, the catch 76 engages only the left-hand portion 73*a* of the toothed member 73**.

Figure 6:
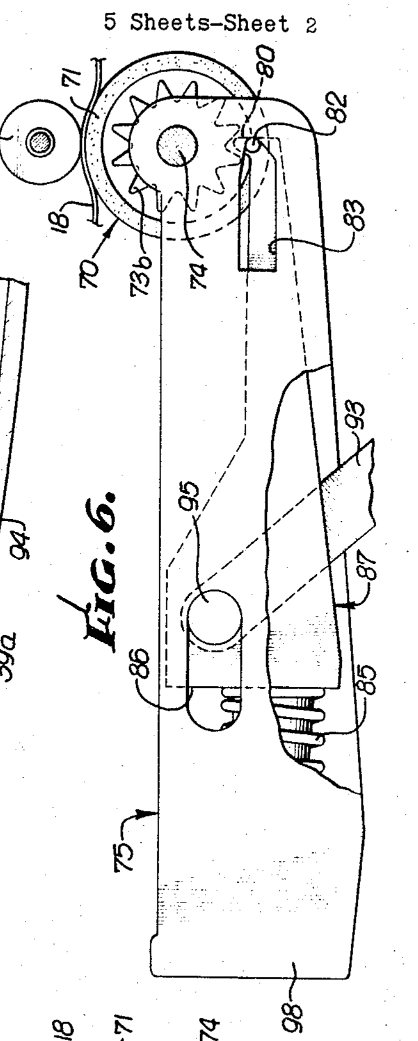
FIG. 6 is an enlarged fragmentary section showing the manner in which the tape driver is actuated by a pusher during return of the actuator to extended position.
Figure 7:
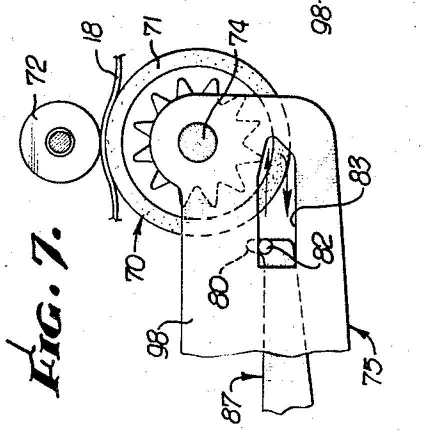
FIG. 7 is an enlarged fragmentary section showing the retracted position of the pusher of FIG. 6.
Figure 10:
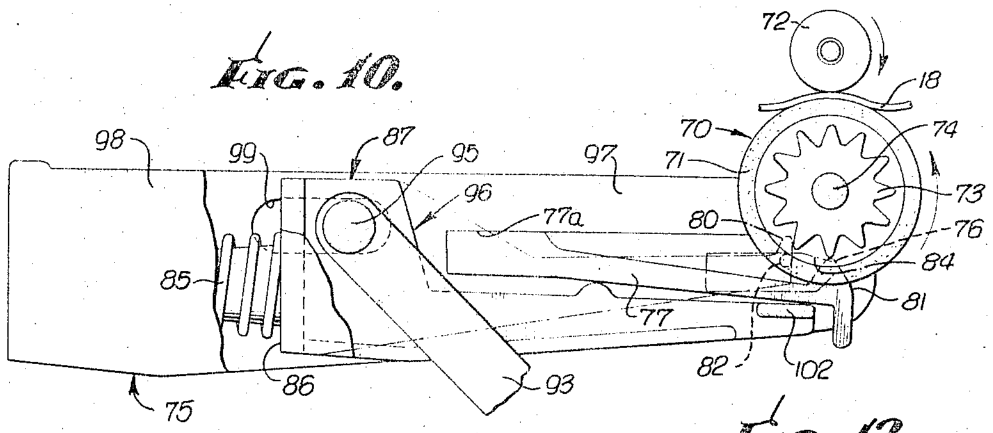
FIG. 10 is a view similar to FIG. 6, but showing the pusher in intermediate position.

A pusher indicated at 80 in FIGS. 6 and 7 is movable to engage the toothed periphery of the right-hand portion **73*b* of toothed member 73 and thereby rotate that member against the bias of the catch 76, the latter thereupon being urged to the position seen at 81 in FIG. 10, such movement of the pusher occurring in response to movement of the actuator 39 between collapsed and extended positions, whether or not the actuator 39 has been completely collapsed to effect embossment of the tape. Referring to FIGS. 6, 7 and 10, the pusher 80 typically carries a pin 82 which projects through a slot 83 in the flange 98 of carrier 75 in order to have camming engagement with slot shoulder 84, as seen in FIG. 10. The latter engagement deflects the pusher so as to effect rotation of the toothed member 73 in response to rearward movement of the pusher. Such movement is typically effected by expansion of a return spring 85 bearing against a shoulder 86 on a sub-carrier 87 for the pusher, the sub-carrier 87 being movable longitudinally between a first position as seen in FIGS. 7 and 8 in which the actuator 39 is collapsed, and a second position as seen in FIGS. 5 and 6 in which the actuator lever 39 is extended outwardly. Such movement of the pusher, of course, rotates toothed member 73 and the driver 70** to advance the tape a predetermined length.

The actuator lever 39 having flanges **39*a* and 39*b*, is shown to extend generally longitudinally and to have pivotal support at 90 in order to pivot inwardly and outwardly relative to the body and in the direction of the arrows 91. Portion 92 of the actuator is adapted to be finger gripped, with the hand of the user placed over the body above portion 92 in FIG. 1. Motion is transmitted from the actuator 39 to the sub-carrier 87 as by means of a link 93 extending between a stop 94 integral with the actuator and a transverse pivot pin 95. The latter connects the link 93 with flanges 96 of the sub-carrier 87 to travel therewith. The terminals of pin 95 are guided for longitudinal movement in a slot 99 formed in the fixed carrier flanges 97 and 98. Also, the carrier 75 is urged up to cause driver 70 to frictionally grip the tape opposite the idler 72, the carrier being tiltably supported at its front end relative to the body 11 at point 180** as seen in FIG. 5.

Sub-carrier 87 is also shown as including a crosspiece 102 extending directly beneath the catch 76 as seen in FIG. 5 so as to resist downward displacement of the catch. FIG. 10 shows crosspiece 102 forwardly displaced to allow yieldable downward displacement of the catch.

Finally, referring to FIGS. 16–19, ribbing extending generally radially is shown as integral with the disc 35 and the element 36 at 110 and 111, respectively. Upon flexing of the fingers 37 associated with the element 36, the ribbing 110 and 111 is caused to engage and hold the tape in stabilized condition during cutting or embossing thereof, the holding action typically being as shown in FIG. 18. Thus, the tape 18 is somewhat deflected from its straight path, but is nevertheless held in stabilized condition, i.e. retained against longitudinal and/or lateral displacement during the cutting or embossing operation. Detent means for yieldingly resisting turning of the rotor 33 is shown at 120 in FIGS. 2, 5 and 8.

As is clear from the foregoing, the tool has the following modes of operation, with respect to tapes of different widths:

(1) Rest and lock mode, with the toothed member 73 gripped to hold driver 70, so that external torques or pull from the tape will not permit the mechanism to advance.

(2) Advance mode of the tape, without tape embossment, due to less than complete collapse of actuator 39, plus release thereof.

(3) Emboss and advance mode of the tape, due to complete collapse and release of the actuator.

(4) Tape insertion mode, with driver 70 displaced from idler 72, permitting advance of the tape irrespective of movement of actuator 39.

(5) Tape pull out mode, in which actuator 39 is slightly collapsed to displace crosspiece 102 forwardly to about FIG. 10 position, allowing rotation of driver 70 and member 73 against ratcheting of the catch 76, the tape frictionally rotating the driver.

(6) Tape cutting mode which in this construction is made operative by rotatively displacing rotor 33 to bring cutters 55, 56, and 58 into adjacency above and below the tape to be cut, and thence to permit the incomplete severance of the tape in response to collapse and release of the actuator 39.

It is believed the foregoing description conveys a good understanding of the objects and advantages of my invention. The appended claims have been drawn to cover all legitimate modifications and adaptations.

I claim:

1. In a tape embossing tool,
a body,
rotor structure having die means adjacent which tape is subject to forward advancement, said structure carried on said body to be displaced relative thereto and relative to the tape so as to bring selected die means into tape engaging position, said structure having an axis of rotation with respect to which tape advances eccentrically,
an actuator carried by the body,
means to cause the selected die means to forcibly engage the tape adjacent thereto in response to operation of the actuator,
means to effect advancement of the tape in response to operation of the actuator and including a driver roll and another roll to compressively engage opposite sides of the tape advanced therebetween and to frictionally drive and direct the tape directly into said rotor structure at the periphery thereof for straight passage therethrough,
spaced, generally longitudinally extending discrete paths formed in the body to receive and guide advancement of tapes of different widths toward and between said rolls, said paths having different widths and fixed position relative to said body, the tape receiving open width of each path remaining essentially unchanged at all times, substantially the entireties of said paths being confined at the entrance side of the rolls longitudinally opposite said die means,
and a tape supply magazine removably carried by the body at one end thereof and having discrete paths to receive and guide advancement of tape of different widths toward said body paths, said magazine paths having different widths and fixed position relative to the body when the magazine is carried by the body.

2. The tool of claim 1, including structure to block and unblock rotation of the driver, thereby to selectively restrain movement of the tape when desired.

3. The tool of claim 1, in which said last named means includes a peripherally toothed member connected to control rotation of the driver roll and thereby to control advancement of the tape, a catch to yieldably bias said member against rotation by engagement with the toothed periphery of said member, the actuator being movable between extended and collapsed positions, and a pusher movable to engage the toothed periphery of said member and thereby rotate said member against the bias of said catch, in response to movement of the actuator between collapsed and extended positions.

4. The tool of claim 3 in which the catch includes a spring finger adapted to flex in a direction to release said member as said member rotates.

5. The tool of claim 3 in which said means to effect advancement of the tape includes a spring urged carrier for the pusher and movable between a first position in which the actuator is collapsed and the pusher is retracted away from said member, and a second position in which the actuator is extended and the pusher has been displaced to rotate said member.

6. The tool of claim 1, in which said body includes split sections interconnected to form complementary portions of said paths.

7. The tool of claim 1, in which said die means includes upper and lower die parts, and said rotor includes an upper rotor disc carrying said upper die parts spaced about said axis and a lower rotor element having fingers carrying said lower die parts and extending away from said axis so as to be individually flexed upwardly toward the upper rotor disc, said means to cause selected die means to forcibly engage the tape including a pusher movable in response to operation of the actuator to effect forcible tape engagement by the lower and upper die parts for embossing tape advanced between complementary die parts.

8. The tool of claim 7, including ribbing on said rotor and presented toward the path of advancement of tape received by the rotor so as to engage and stabilize the tape during embossing thereof.

9. The tool of claim 1, in which said die means include cutters carried by said structure to cut only part way through the tape directionally normal to the plane thereof and at locations spaced apart in the direction of tape advancement.

10. In an embossing tool for tape having upper and lower layers, an elongated body, structure having die means adjacent which tape is subject to advancement, said structure carried on said body to be bodily displaced relative thereto and relative to the tape so as to bring selected die means into tape engaging position, a hand operated actuator carried by said body, and means to cause selected die means to forcibly engage the tape adjacent thereto in response to operation of the actuator, said die means including cutters carried by said structure to cut across the entire width of the tape but only part way through the tape directionally normal to the plane thereof and at locations spaced apart in the direction of tape advancement, thereby to free the tape for severing, two of said cutters being spaced longitudinally to cut through only one layer of the tape, and a third cutter being located to cut into the opposite layer of the tape and generally intermediate the cuts into said one layer.

11. The tool of claim 10, in which the die means include complementary upper and lower embossing die parts, said structure including an upper disc rotor having an axis of rotation and carrying said upper embossing die parts spaced about said axis and said two cutters, said structure also including a lower rotor element rotatable about said axis with said upper disc rotor and having fingers carrying lower embossing die parts and extending away from said axis so as to be individually flexed toward the upper rotor disc.

12. In an embossing tool for tape having upper and lower layers, an elongated body, structure having die means adjacent which tape is subject to advancement, said structure carried on said body to be bodily displaced relative thereto and relative to the tape so as to bring selected die means into tape engaging position, a hand operated actuator carried by said body, and means to cause selected die means to forcibly engage the tape adjacent thereto in response to operation of the actuator, said die means including cutters carried by said structure to cut only part way through the tape at locations spaced apart in the direction of tape advancement, thereby to free the tape for severing, two cutters being spaced longitudinally to cut through one layer of tape and a third cutter being located to cut into the opposite layer of the tape and generally intermediate the cuts into said one layer, said die means including complementary upper and lower embossing die parts, said structure including an upper disc rotor having an axis of rotation and carrying said upper embossing die parts spaced about said axis and said two cutters, said structure also including a lower rotor element rotatable about said axis with said upper disc rotor and having fingers carrying lower embossing die parts and extending away from said axis so as to be individually flexed toward the upper rotor disc, the tape being receivable between said fingers and said upper disc rotor and including ribbing on said upper rotor disc and on said fingers and presented toward the path of tape advancement therebetween to engage and stabilize the tape during embossing thereof.

References Cited

UNITED STATES PATENTS

| | | | |
|---|---|---|---|
| 2,930,465 | 3/1960 | Lotsch | 197—6.7 |
| 3,091,318 | 5/1963 | Carboni | 197—6.7 |
| 3,127,989 | 4/1964 | Travaglio | 197—6.7 XR |
| 3,129,800 | 4/1964 | Bogeaus | 197—6.7 |
| 3,133,495 | 5/1964 | De Man | 197—6.7 XR |
| 3,155,215 | 11/1964 | Avery | 197—6.7 |
| 3,239,048 | 3/1966 | Bogeaus | 197—6.7 |
| 3,272,301 | 9/1966 | Craig | 197—6.7 |
| 3,276,559 | 10/1966 | De Man | 197—6.7 |
| 3,277,992 | 10/1966 | Bremer | 197—6.7 |
| 3,288,259 | 11/1966 | Bremer | 197—6.7 |
| 3,289,803 | 12/1966 | Pederson | 197—6.7 |

ROBERT E. PULFREY, *Primary Examiner.*

E. S. BURR, *Examiner.*